United States Patent
Li et al.

(10) Patent No.: US 9,892,303 B2
(45) Date of Patent: Feb. 13, 2018

(54) DISPLAY PANEL, ELECTRONIC APPARATUS HAVING THE SAME, AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Changfeng Li, Beijing (CN); Xue Dong, Beijing (CN); Xiaochuan Chen, Beijing (CN); Haisheng Wang, Beijing (CN); Yingming Liu, Beijing (CN); Lei Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/501,855

(22) PCT Filed: May 20, 2016

(86) PCT No.: PCT/CN2016/082888
§ 371 (c)(1),
(2) Date: Feb. 5, 2017

(87) PCT Pub. No.: WO2017/036188
PCT Pub. Date: Mar. 9, 2017

(65) Prior Publication Data
US 2017/0228580 A1    Aug. 10, 2017

(30) Foreign Application Priority Data
Aug. 28, 2015  (CN) .......................... 2015 1 0544090

(51) Int. Cl.
*G06K 9/00* (2006.01)
*G09G 5/10* (2006.01)

(52) U.S. Cl.
CPC ....... *G06K 9/00013* (2013.01); *G06K 9/0008* (2013.01); *G09G 5/10* (2013.01)

(58) Field of Classification Search
None
See application file for complete search history.

(56) References Cited

U.S. PATENT DOCUMENTS

| | | | | |
|---|---|---|---|---|
| 6,128,399 A | * | 10/2000 | Calmel | ............... G06K 9/0004 |
| | | | | 358/474 |
| 2002/0196036 A1 | * | 12/2002 | Toyoshima | .......... G06K 9/0002 |
| | | | | 324/702 |

(Continued)

FOREIGN PATENT DOCUMENTS

| | | | |
|---|---|---|---|
| CN | 104166489 A | 11/2014 | |
| CN | 104570449 A | 4/2015 | |
| CN | 105095872 A * | 11/2015 | ........... G06K 9/0004 |

OTHER PUBLICATIONS

International Search Report & Written Opinion dated Aug. 19, 2016 regarding PCT/CN2016/082888.

*Primary Examiner* — Nicholas Lee
*Assistant Examiner* — Benjamin Casarez
(74) *Attorney, Agent, or Firm* — Intellectual Valley Law, P.C.

(57) ABSTRACT

A display panel having a plurality of pixels, each of which includes a subpixel region and an inter-subpixel region. The display panel includes a light filtering layer forming a light filtering region within the inter-subpixel region, the light filtering layer comprising a light filtering material at least partially transmissive for a light of a selected wavelength; and a photosensor in the light filtering region for detecting (Continued)

the light of the selected wavelength, the photosensor being sensitive to the light of the selected wavelength.

19 Claims, 4 Drawing Sheets

(56) References Cited

U.S. PATENT DOCUMENTS

| | | | | |
|---|---|---|---|---|
| 2003/0183019 | A1* | 10/2003 | Chae | G06K 9/0004 |
| | | | | 73/862.624 |
| 2005/0013469 | A1* | 1/2005 | Yang | G06K 9/0004 |
| | | | | 382/124 |
| 2006/0011913 | A1* | 1/2006 | Yamazaki | G06F 3/0412 |
| | | | | 257/59 |
| 2008/0180583 | A1* | 7/2008 | Harada | G02F 1/0126 |
| | | | | 349/12 |
| 2012/0127140 | A1 | 5/2012 | Ryan et al. | |
| 2013/0033455 | A1* | 2/2013 | Jeong | G06F 3/042 |
| | | | | 345/175 |
| 2013/0120760 | A1* | 5/2013 | Raguin | G01B 11/24 |
| | | | | 356/612 |
| 2015/0294099 | A1* | 10/2015 | Frye | G06F 21/32 |
| | | | | 340/5.83 |
| 2015/0369661 | A1* | 12/2015 | Lin | G06K 9/0004 |
| | | | | 250/227.11 |
| 2016/0103359 | A1* | 4/2016 | Kimura | G02B 5/201 |
| | | | | 349/33 |
| 2016/0132713 | A1* | 5/2016 | Bae | G06F 3/0412 |
| | | | | 345/174 |
| 2016/0266695 | A1* | 9/2016 | Bae | G06F 1/1643 |
| 2017/0161541 | A1* | 6/2017 | Li | G06K 9/0004 |
| 2017/0221972 | A1* | 8/2017 | Yang | H01L 27/3227 |
| | | | | 257/40 |

* cited by examiner

DISPLAY PANEL, ELECTRONIC APPARATUS HAVING THE SAME, AND DRIVING METHOD THEREOF

CROSS-REFERENCE TO RELATED APPLICATION

This application is a national stage application under 35 U.S.C. § 371 of International Application No. PCT/CN2016/082888, filed May 20, 2016, which claims priority to Chinese Patent Application No. 201510544090.5, filed Aug. 28, 2015, the contents of which are incorporated by reference in the entirety.

TECHNICAL FIELD

The present invention relates to display technology, more particularly, to a display panel, an electronic apparatus having the same, and a driving method thereof.

BACKGROUND

In recent years, various methods have been proposed in fingerprint and palmprint recognition. Examples of optical method for recognizing fingerprint and palmprint include total reflection method, light-path separation method, and scanning method. In a total reflection method, light from a light source such as ambient light enters into a pixel, and is totally reflected on the surface of a package substrate. When a finger or palm touches the display panel, the total reflection condition of the surface changes locally upon touch, leading to a disruption of the total reflection locally. The disruption of the total reflection results in a reduced reflection. Based on this principle, the ridge lines of a finger may be differentiated from the valley lines. Alternatively, fingerprint and palmprint may be recognized by detecting changes in capacitance when a finger touches the display panel.

In conventional fingerprint recognition display panels, the photosensor and other associated components are disposed in the subpixel regions of the pixels, decreasing aperture ratio of the display panel.

SUMMARY

In one aspect, the present invention provides a display panel having a plurality of pixels, each of which includes at least one subpixel region and an inter-subpixel region, the display panel comprising a light filtering layer forming a light filtering region within the inter-subpixel region, the light filtering layer comprising a light filtering Material at least partially transmissive for a light of a selected wavelength; and a photosensor in the light filtering region for detecting the light of the selected wavelength, the photosensor being sensitive to the light of the selected wavelength.

Optionally, the light filtering material is a visible light blocking material.

Optionally, the light filtering layer is made of a light filtering material comprising germanium or germanium oxide.

Optionally, the selected wavelength is outside the range of visible light wavelengths.

Optionally, the light of the selected wavelength is an infrared light.

Optionally, the light of the selected wavelength is an ultraviolet light.

Optionally, the display panel further comprises a thin film transistor coupled to the photosensor for receiving a current from the photosensor.

Optionally, the thin film transistor is in the light filtering region.

Optionally, each pixel comprises at least one photosensor and at least one thin film transistor coupled to the at least one photosensor.

Optionally, each pixel comprises a plurality of subpixels, each of the plurality of subpixels comprises at least one photosensor and at least one thin film transistor coupled to the at least one photosensor.

Optionally, the photosensor comprises a transparent electrode layer proximal to a light emitting surface of the display panel; a photoelectric conversion layer on a side of the transparent electrode layer distal to the light emitting surface of the display panel, wherein a resistance of the photoelectric conversion layer undergoes a change when the photoelectric conversion layer is irradiated by the light of the selected wavelength; and a non-transparent electrode layer on a side of the photoelectric conversion layer distal to the transparent electrode layer.

Optionally, the thin film transistor comprises a gate node, a first node, and a second node; the non-transparent electrode layer is in a same layer as, and electrically isolated from, the gate node; and the photoelectric conversion layer is in a same layer as, and electrically connected to, the second node.

Optionally, the photoelectric conversion layer is made of a material selected from the group consisting of lead sulfate, indium tin zinc oxide, and indium gallium zinc oxide.

Optionally, the display panel further comprises a control module coupled to the photosensor and the thin film transistor.

Optionally, the gate node of the thin film transistor is connected to an output terminal of the control module for receiving scan signals from the control module; the second node of the thin film transistor is connected to the photoelectric conversion layer for receiving the current of the photosensor, the first node of the thin film transistor is connected to an input terminal of the control module for transmitting a current signal to the control module; the transparent electrode layer of the photosensor is connected to the control module for receiving a first voltage signal from the control module; and the non-transparent electrode layer of the photosensor is connected to the control module for receiving a second voltage signal from the control module, the second voltage signal being different from the first voltage signal.

Optionally, the control module comprises a comparator for comparing the current signal received from the first node of the thin film transistor with a control value; the control module determines the current signal to be a signal associated with a ridge line of a fingerprint or a palmprint when a difference between the current signal and the control value is larger than a threshold value.

Optionally, the display panel further comprises a light guide in the light filtering region on a side of the light filtering layer distal to the photosensor, the light guide being capable of reflecting the light of the selected wavelength by total reflection.

In another aspect, the present invention provides a method for driving a display panel described herein, the method comprising providing a voltage signal to the photosensor in the light filtering region; providing a scan signal to a gate electrode of the thin film transistor; receiving a current signal from a first node of the thin film transistor; comparing the current signal received from the first node of the thin film transistor with a control value; and determining the current signal to be a signal associated with a ridge line of a fingerprint or a palmprint when a difference between the current signal and the control value is larger than a threshold value.

Optionally, the step of providing the voltage signal to the photosensor in the light filtering region comprises providing a first voltage signal to a transparent electrode layer of the photosensor, and providing a second voltage signal to a non-transparent electrode layer of the photosensor, the second voltage signal being different from the first voltage signal.

Optionally, the step of receiving the current signal from the first node of the thin film transistor comprises receiving the current signal from the first node of the thin film transistor through a read line connecting the first node and the control module.

In another aspect, the present invention provides an electronic apparatus comprising a display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
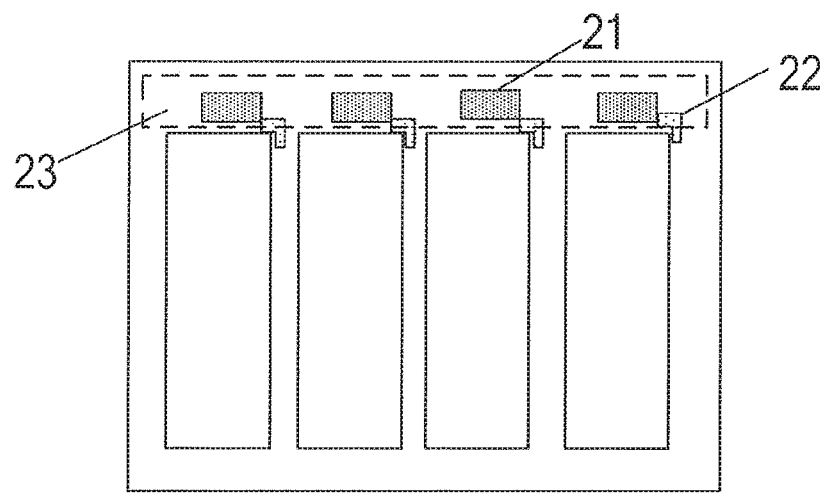
FIG. 1 is a diagram illustrating the structure of a display panel in some embodiments.

The disclosure will now describe more specifically with reference to the following embodiments. It is to be noted that the following descriptions of sonic embodiments are presented herein for purpose of illustration and description only. It is not intended to be exhaustive or to be limited to the precise form disclosed.

The present disclosure prow-ides a novel and superior display panel for biometrics (e.g., fingerprint or palmprint) detection, an electronic apparatus having the same, and a driving method thereof. The present display panel has an increased aperture ratio as compared to conventional fingerprint detection display panels. In some embodiments, the display panel includes a plurality of pixels, each of which includes at least one subpixel region and an inter-subpixel region. As used herein, a subpixel region refers to a light emission region of a subpixel, such as a region corresponding to a pixel electrode in a liquid crystal display or a region corresponding to a light emissive layer in an organic light emitting display. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel. As used herein, an inter-subpixel region refers to a region between adjacent subpixel regions, such as a region corresponding to a black matrix in a liquid crystal display or a region corresponding a pixel definition layer in an organic light emitting display. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

In some embodiments, the display panel includes a light filtering layer forming a light filtering region. Optionally, the light filtering region is limited within an inter-subpixel region. The light filtering layer includes (e.g., is made of) a light filtering material that is at least partially transmissive for a light of a selected wavelength. Optionally, the tight filtering layer includes (e.g., is made of) a light filtering material that is not transmissive for a visible light. Optionally, the light filtering layer includes (e.g., is made of) a visible light blocking material. Optionally, the light filtering layer includes (e.g., is made of) a light filtering material that is transmissive for an infrared tight. Optionally, the light filtering layer includes (e.g., is made of) light filtering material that is transmissive for an ultraviolet light. Optionally, the light filtering layer is made of a light filtering material including germanium or germanium oxide.

In some embodiments, the display panel further includes a photosensor in the light filtering region for detecting the light of the selected wavelength, the photosensor being a photosensor sensitive to the light of the selected wavelength. For example, irradiation by the light of the selected wavelength induces a current change in the photosensor. Optionally, the selected wavelength is outside the range of visible light wavelengths. Optionally, the selected wavelength is in the range of infrared light wavelengths. Optionally, the selected wavelength is in the range of ultraviolet light wavelengths. Optionally, the light filtering layer includes (e.g., is made of) a visible light blocking material, and the selected wavelength is outside the range of visible light wavelengths.

In some embodiments, the light filtering layer is disposed on a package substrate, which corresponds to a light emitting side of the display panel. The photosensor and the thin film transistor coupled to the photosensor are disposed on a side of the light filtering layer distal to the package substrate. Optionally, the photosensor and the thin film transistor coupled to the photosensor are disposed on an array substrate.

Optionally, the inter-subpixel region includes a black matrix layer interspersed with a plurality of light filtering layers, each light filtering layer corresponding to a photosensor. Optionally, the light filtering layer is disposed substantially throughout the entire inter-subpixel region of the display panel, e.g., the light filtering region is substantially co-extensive with the inter-subpixel region.

FIG. 1 is a diagram illustrating the structure of a display panel in some embodiments. Referring to FIG. 1, the display panel in the embodiment includes a photosensor 21 and a thin film transistor 22 coupled to the photosensor 21. The photosensor 21 is disposed in a light filtering region of the display panel. The light filtering region is a region at least partially transmissive for a light of a selected wavelength.

The present display panel includes a photosensor in the light filtering region that is at least partially transmissive for a light of a selected wavelength. The photosensor detects fingerprint or palmprint information by detecting the light of the selected wavelength. By disposing the photosensor in the light filtering region, which is limited within the inter-subpixel region, the present display panel achieves an increased aperture ratio as compared to conventional fingerprint detection display panels.

In some embodiments, the display panel includes a light filtering layer forming a light filtering region. Any appropriate light filtering material may be used for making the light filtering layer. Optionally, the light filtering layer includes (e.g., is made of) a visible light blocking material. Optionally, the light filtering layer is made of a light filtering material comprising germanium or germanium oxide.

Optionally, the light filtering region is not transmissive for a visible light (i.e., visible light blocking), and is at least partially transmissive for a light having a wavelength outside the range of visible light wavelengths (e.g., an infrared light or an ultraviolet light). Optionally, the light filtering region corresponds to a black matrix region in a liquid crystal display or a pixel definition layer region in an organic light emitting display.

Optionally, the light of the selected wavelength is an infrared light. Optionally, the light of the selected wavelength is an ultraviolet light. Optionally, the light of the selected wavelength is a near infrared light. Optionally, the light of the selected wavelength is a near ultraviolet light.

Figure 2:
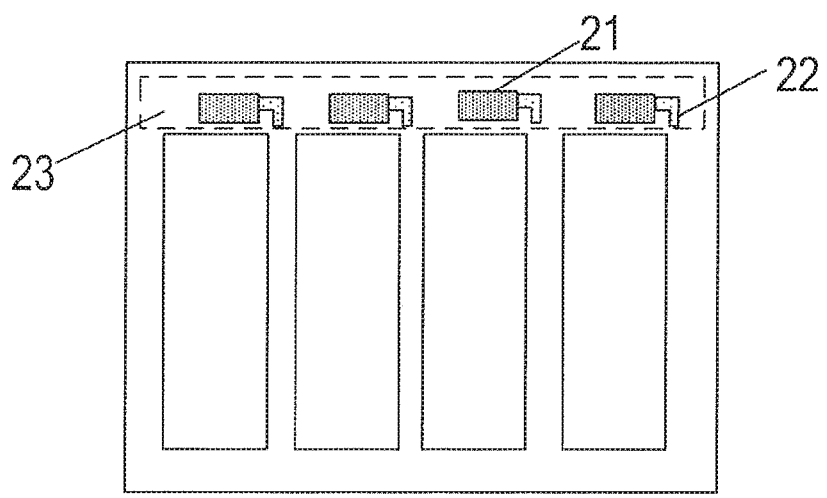
FIG. 2 is a diagram illustrating the structure of a display panel in some embodiments.

In some embodiments, the thin film transistor 22 coupled to the photosensor 21 is in the light filtering region 23. FIG. 2 is a diagram illustrating the structure of a display panel in some embodiments. Referring to FIG. 2, the photosensor 21 and the thin film transistor 22 coupled to the photosensor 21 are both in the light filtering region 23. By have this design, the aperture ratio of the display panel may be further increased.

Optionally, the thin film transistor 22 is outside the light filtering region 23. Optionally, the thin film transistor 22 is within the inter-subpixel region. Optionally, the thin film transistor 22 is outside the light filtering region 23 but within the inter-subpixel region.

Optionally, each pixel comprises at least one photosensor and at least one thin film transistor coupled to the at least one photosensor. Optionally, each subpixel comprises at least one photosensor and at least one thin film transistor coupled to the at least one photosensor.

In some embodiments, the display panel includes a plurality of pixels. Optionally, each pixel includes a plurality of subpixels (e.g., three subpixels or four subpixels). Optionally, the photosensor 21 is disposed in the light filtering region 23 of every subpixel of a pixel. Optionally, the photosensor 21 is disposed in the light filtering region 23 of one subpixel of a pixel. Various alternative embodiments may be practiced for making various biometrics detection display panels. The density of photosensors in a display panel may vary depending on various factors, e.g., the size of the display panel, the size of the photosensor, and design needs. For example, a high density of photosensors may be required in an electronic apparatus for high accuracy fingerprint detection, whereas a lower density may be sufficient for detecting palmprint detection.

Figure 3:
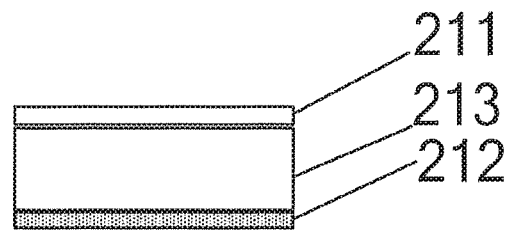
FIG. 3 is a diagram illustrating the structure of a photosensor in some embodiments.

FIG. 3 is a diagram illustrating the structure of a photosensor in some embodiments. Referring to FIG. 3, the photosensor 21 in the embodiment includes a transparent electrode layer 211, a non-transparent electrode layer 212 (e.g., a non-transparent metal electrode layer), and a photoelectric conversion layer 213 sandwiched between the transparent electrode layer 211 and the non-transparent electrode layer 212. A resistance of the photoelectric conversion layer 213 undergoes a change when the photoelectric conversion layer is irradiated by the light of the selected wavelength.

The non-transparent electrode layer 212 is a light blocking layer, e.g., a light reflective metal electrode layer. Without a non-transparent electrode layer 212, light emitted from a backlight module may irradiate on the photoelectric conversion layer 213, inducing a change in resistance of the photoelectric conversion layer 213. It may be difficult to distinguish the current change caused by the backlight irradiation from a current change caused by light intensity change resulting from disruption of total reflection during a touch event. By having the non-transparent electrode layer 212, the light from the backlight module can be blocked before it reaches the photoelectric conversion layer 213. Various appropriate materials may be used for making the non-transparent electrode layer 212. Optionally, the non-transparent electrode layer 212 is made of a non-transparent conductive material. Optionally, the non-transparent conductive material is the same as the material for making a gate electrode in the thin film transistor coupled to the photosensor. Optionally, the non-transparent electrode layer 212 is made of a non-transparent metal. Optionally, the non-transparent metal is the same as the metal for making a gate electrode in the thin film transistor coupled to the photosensor.

The transparent electrode layer is light transmissive, allowing incident light irradiating on the photoelectric conversion layer 213.

In some embodiments, the thin film transistor coupled to the photosensor includes a gate node, a first node, and a second node. Optionally, the non-transparent electrode layer 212 is in a same layer as, and electrically isolated from, the gate node. Optionally, the photoelectric conversion layer 213 is in a same layer as, and electrically connected to, the second node.

Figure 4:
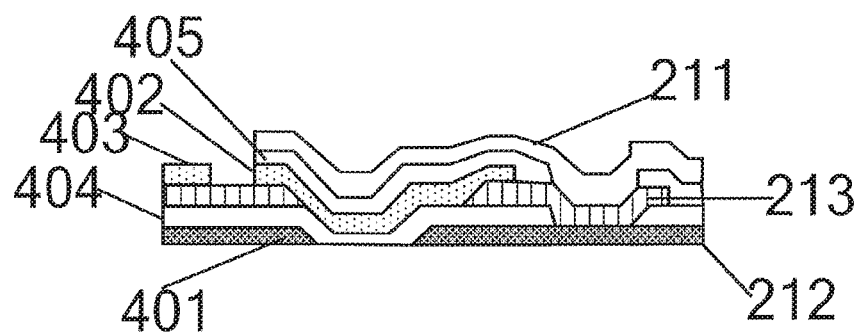
FIG. 4 is a diagram illustrating the structure of a photosensor and a thin film transistor coupled to the photosensor in some embodiments.

FIG. 4 is a diagram illustrating the structure of a photosensor and a thin film transistor coupled to the photosensor in some embodiments. Referring to FIG. 4, the thin film transistor includes a gate node 401, a first node 403, and a second node 402. The gate node 401 of the thin film transistor is in a same layer as, and electrically isolated from, the non-transparent electrode layer 212, the second node 402 of the thin film transistor is in a same layer as, and electrically connected to, the photoelectric conversion layer 213. The thin film transistor includes a gate insulating layer 404 between the gate electrode 401 and the second node 402, i.e., the second node 402 is on a side of the gate insulating layer 404 distal to the gate electrode 401. Further, the thin film transistor further includes a resin layer 405 on a side of the second node 402 distal to the gate electrode 401. As shown in FIG. 4, the transparent electrode layer 211 of the photosensor extends into an area corresponding to the second node 402 of the thin film transistor, the transparent electrode layer 211 is on a side of the resin layer 405 distal to the second node 402.

Various appropriate photoelectric conversion materials may be used for making the photoelectric conversion layer 213. Examples of appropriate photoelectric conversion materials include, but are not limited to, lead sulfate, indium tin zinc oxide, and indium gallium zinc oxide.

In some embodiments, the light of the selected wavelength is an infrared light or a near infrared light. Optionally, the photoelectric conversion layer 213 is made of a photoelectric conversion material sensitive to an infrared light or a near infrared light, e.g., lead sulfate.

In some embodiments, the light of the selected wavelength is an ultraviolet light or a near ultraviolet light. Optionally, the photoelectric conversion layer 213 is made of a photoelectric conversion material sensitive to an ultraviolet light or a near ultraviolet light, e.g., indium tin zinc oxide or indium gallium zinc oxide.

Figure 5:
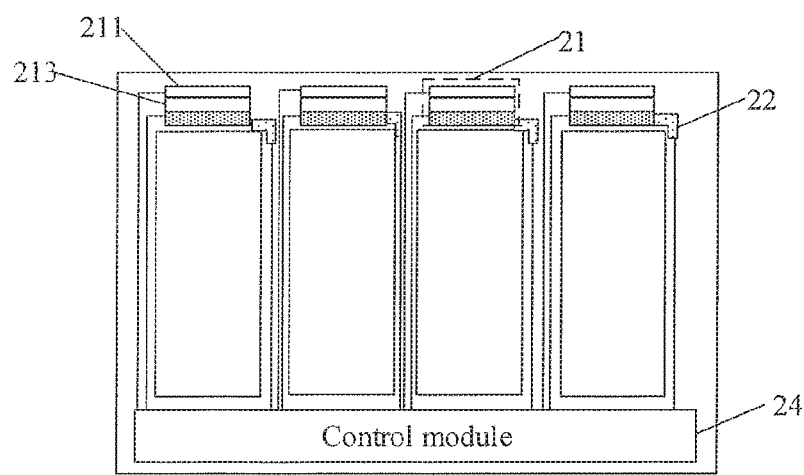
FIG. 5 is a diagram illustrating the structure of a display panel in some embodiments.

FIG. 5 is a diagram illustrating the structure of a display panel in some embodiments. Referring to FIG. 5, the display panel in the embodiment further includes a control module 24 coupled to the photosensor 21 and the thin film transistor 22. As shown in FIG. 5, the gate node of the thin film transistor 22 is connected to an output terminal of the control module 24 for receiving scan signals from the control module 24, the second node of the thin film transistor 22 is connected to the photoelectric conversion layer 213 for receiving the current of the photosensor 21, the first node of the thin film transistor 22 is connected to an input terminal of the control module 24 for transmitting a current signal to the control module 24, and the transparent electrode layer and the non-transparent electrode layer of the photosensor 21 is connected to the control module 24, respectively, for receiving voltage signals from the control module 24. In some embodiments, the transparent electrode layer of the photosensor 21 is connected to the control module 24 for receiving a first voltage signal from the control module 24, and the non-transparent electrode layer of the photosensor 21 is connected to the control module 24 for receiving a second voltage signal from the control module 24, the second voltage signal being different from the first voltage signal.

Thus, the control module 24 provides a first voltage signal to the transparent electrode layer of the photosensor 21 in the light filtering region, and provides a second voltage signal to the non-transparent electrode layer of the photosensor 21 in the light filtering region. Optionally, the control module 24 provide scan signals to a gate electrode of the thin film transistor 22, receives a current signal from the first node of the thin film transistor 22.

In some embodiments, the control module 24 further includes a comparator. The comparator compares the current signal received from the first node of the thin film transistor 22 with a control value. The control module 24 then determines the current signal to be a signal associated with a ridge line of a fingerprint when a difference between the current signal and the control value is larger than a threshold value.

Optionally, the control module 24 is an integrated control circuit for controlling the display panel. Optionally, the control module 24 is an independent control circuit for controlling fingerprint and palmprint detection of the display panel independently. Accordingly, the present control module 24 may control the photosensor 21 for detecting fingerprint and palmprint without affecting the control function of the integrated control circuit for controlling image display.

The control module 24 provides voltage signals to the photosensor 21. Specifically, the control module 24 provides a first voltage signal to the transparent electrode layer, and provides a second voltage signal to the non-transparent electrode layer. The photoelectric conversion layer has a resistance. Under the first voltage signal and the second voltage signal, the photosensor produces a stable current. When the photoelectric conversion layer is irradiated by a light of a selected wavelength, the resistance of the photoelectric conversion layer undergoes a change, resulting in a current change. The thin film transistor 22 coupled to the photosensor 21 is a thin film transistor separate and distinct from the thin film transistor for controlling the display function of the pixel. Accordingly, the scan signals provided by the control module 24 to the gate electrode of the thin film transistor 22 for turning on or off the thin film transistor 24 are separate and distinct from scan signals for turning on or off the thin film transistor for controlling the display function of the pixel. The voltage signals provided by the control module 24 to the transparent electrode layer and the non-transparent electrode layer of the photosensor 21 are also separate and distinct from the scan signals for turning on or off the thin film transistor for controlling the display function of the pixel.

Figure 6:
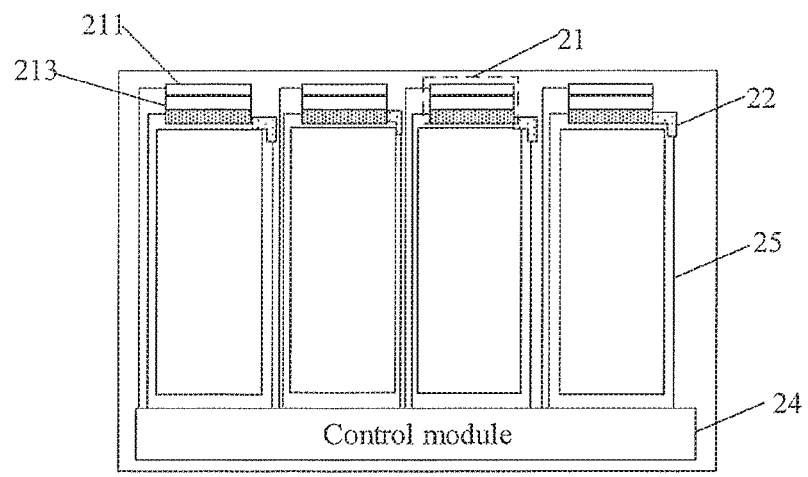
FIG. 6 is a diagram illustrating the structure of a display panel in some embodiments.

FIG. 6 is a diagram illustrating the structure of a display panel in some embodiments. Referring to FIG. 6, the display panel in the embodiment further includes a read line 25 connecting the first node of the thin film transistor 22 and the control module 24 for transmitting a current signal from the first node to the control module 24.

In some embodiments, the read line 25 is in a same layer as the first node and the second node of the thin film transistor 22, and is connected to the first node of the thin film transistor 22. When the thin film transistor 22 is turned on by a scan signal, the read line 25 transmits a current signal from the first node to the control module 24.

Figure 7:
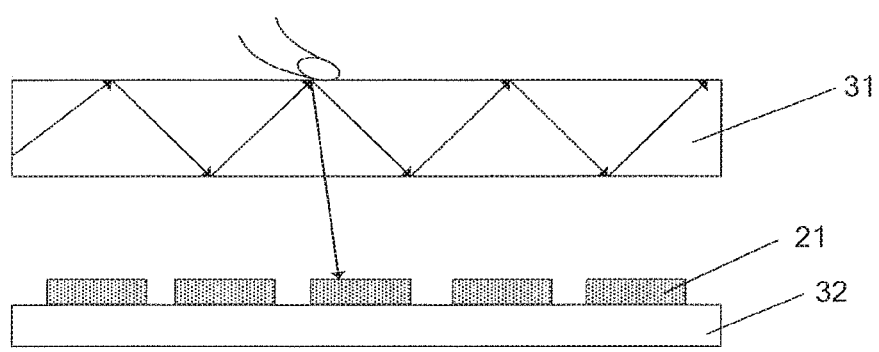
FIG. 7 is a diagram illustrating the working principle of a photosensor in some embodiments.

FIG. 7 is a diagram illustrating the working principle of a photosensor in sonic embodiments. Referring to FIG. 7, the display panel further includes a light guide 31 capable of reflecting light by total reflection in the light filtering region. Optionally, the light guide 31 is disposed on the package substrate on a side of the light filtering layer distal to the photosensor 21. Optionally, the light filtering layer and the light guide 31 are integrated as a dual-function single layer, i.e., the light guide 31 is made of a light filtering material at least partially transmissive for a light of a selected wavelength (i.e., functions as a light filtering layer), and at the same time it is capable of reflecting light by total reflection (i.e., functions as a light guide). Optionally, the light guide 31 is part of a glass substrate of the package substrate.

The light guide 31 includes a bottom surface proximal to the photosensor 21; a top surface opposite to the bottom surface, the top surface distal to the photosensor 21; and two side surface connecting the top surface and the bottom surface. The light of a selected wavelength may enter the light guide 31 from the bottom surface or two side surfaces, and is totally reflected inside the light guide 31 (e.g., between the top surface and the bottom surface). The light being totally reflected inside the light guide 31 does not irradiate on the photosensor 21, which is connected to a control module for receiving voltage signals from the control module (e.g., a first voltage signal on the transparent electrode layer and a second voltage signal on the non-transparent electrode layer), Under the voltage signals, the photosensor 21 produces a stable current.

When there is no touch event, the total reflection condition does not change, and the light being totally reflected inside the light guide 31 does not irradiate on the photosensor 21. Without a change in irradiation intensity, the resistance of the photoelectric conversion layer of the photosensor 21 does not change, and the current produced by the photosensor 21 remains substantially unchanged. During a touch event, the physical contact of a finger with the top surface of the light guide 31 changes the total reflection condition locally upon touch, leading to disruption of the total reflection locally. As a result, a portion of light is reflected back to the subpixel, and irradiates on the photosensor 21, leading to a change in the resistance of the photoelectric conversion layer of the photosensor 21 and in turn a change in the current produced by the photosensor 21 under the first voltage signal and the second voltage signal. During a touch event, the ridge lines are in touch with the light guide 31 whereas the valley lines of a finger or a palm are not in touch with the light guide 31. When a current change is detected, and the current change is larger than a threshold value, it can be determined that the position of the subpixel having the photosensor that produces a current change corresponds to a ridge line of the finger or the palm.

Figure 8:
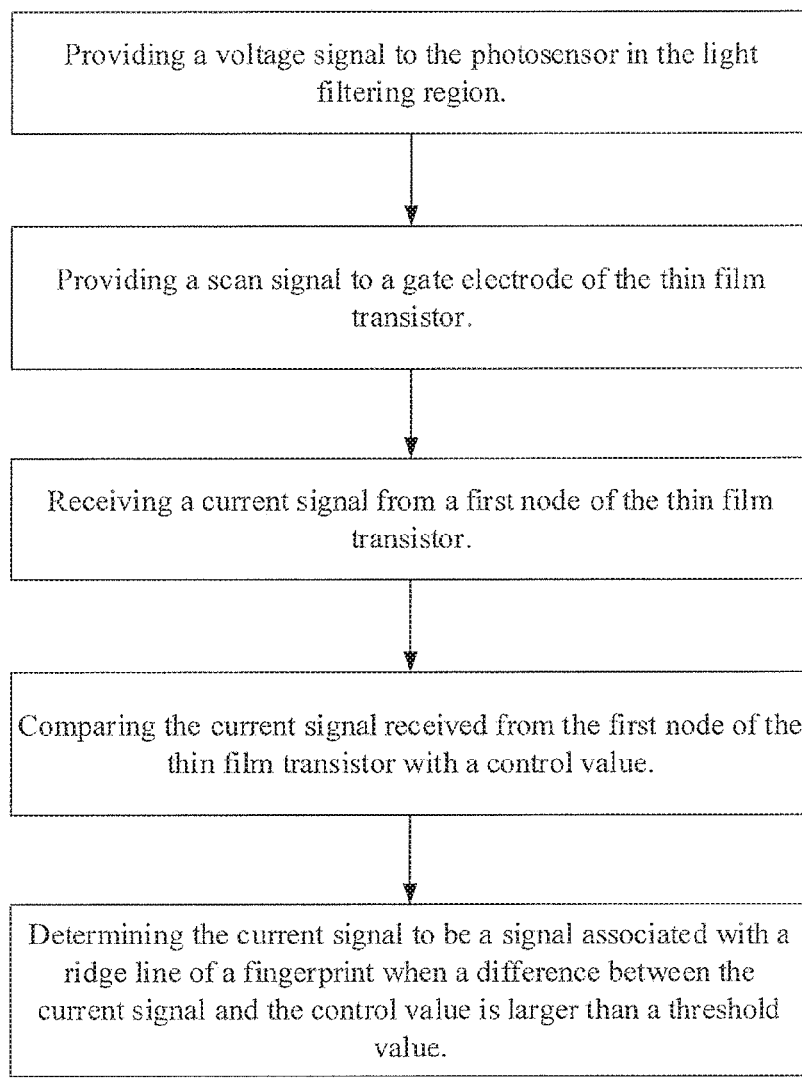
FIG. 8 is a flow chart illustrating a method of driving a display panel in some embodiments.

FIG. 8 is a flow chart illustrating a method of driving a display panel in some embodiments. Referring to FIG. 8, the method in the embodiment includes providing a voltage signal to the photosensor in the light filtering region; providing a scan signal to a gate electrode of the thin film transistor; receiving a current signal from a first node of the thin film transistor; comparing the current signal received from the first node of the thin film transistor with a control value; and determining the current signal to be a signal associated with a ridge line of a fingerprint or a palmprint when a difference between the current signal and the control value is larger than a threshold value. The threshold value may be an absolute value or a fraction of the control value (e.g., 5%, 10%, 20%, or 30% of the control value).

In some embodiments, the step of providing a voltage signal to the photosensor includes provide a first voltage signal to a transparent electrode layer of the photosensor, and providing a second voltage signal to a non-transparent electrode layer of the photosensor, the second voltage signal being different from the first voltage signal. Under the voltage signals, the photosensor 21 produces a stable current in the absence of a touch event.

In some embodiments, the step of receiving the current signal from the first node of the thin film transistor includes receiving the current signal from the first node of the thin film transistor through a read line connecting the first node and the control module.

Upon receiving a scan signal at the gate electrode, the thin film transistor transmits current signal to the control module, whether or not there is a current change. Upon receiving the current signal from the thin film transistor, the control module compares the received current signal with a control value. When the difference between the current signal and the control value is larger than a threshold value, the control module determines that the current signal is a signal associated with a ridge line of a fingerprint or a palmprint. When the difference between the current signal and the control value is smaller than a threshold value, the control module determines that there is no fingerprint or palmprint. Optionally, the positions of the valley lines may be determined based on the fact that a plurality of ridge lines are spaced apart by a plurality of valley line. Once the positions of the ridge lines are determined, the space between the ridge lines can be determined to be the valley lines.

In the present method for driving a display panel, a first voltage signal is provided to a transparent electrode layer of the photosensor, and a second voltage signal is provided to a non-transparent electrode layer of the photosensor, the second voltage signal being different from the first voltage signal. Under the first voltage signal and the second voltage signal, the photosensor produces a current. A scan signal is provided to the gate electrode of the thin film transistor coupled to the photosensor to turn on the thin film transistor. When the thin film transistor is turned on, a current signal from a first node of the thin film transistor is received and compared with a control value. When a difference between the current signal and the control value is larger than a threshold value, it is determined that the current signal is a signal associated with a ridge line of a fingerprint or a palmprint. Based on the above, fingerprint or palmprint information can be detected by a display panel having the present photosensor and the thin film transistor. By disposing the photosensor in the light filtering region, which is limited, within the inter-subpixel region, the present display panel achieves an increased aperture ratio as compared to conventional fingerprint detection display panels.

The present display panel includes a photosensor in the light filtering region that is at least partially transmissive for a light of a selected wavelength. The photosensor detects fingerprint or palmprint information by detecting the light of the selected wavelength. By disposing the photosensor in the light filtering region, which is limited within the inter-subpixel region, the present display panel achieves an increased aperture ratio as compared to conventional fingerprint detection display panels.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with. noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having a plurality of pixels, each of which includes a subpixel region and an inter-subpixel region, the display panel comprising:
   a light filtering layer forming a light filtering region within the inter-subpixel region, the light filtering layer comprising a light filtering material at least partially transmissive for a light of a selected wavelength;

a photosensor in the light filtering region for detecting the light of the selected wavelength, the photosensor being sensitive to the light of the selected wavelength; and a thin film transistor coupled to the photosensor for receiving a current from the photosensor;

wherein the photosensor comprises:

a transparent electrode layer proximal to a light emitting surface of the display panel;

a photoelectric conversion layer on a side of the transparent electrode layer distal to the light emitting surface of the display panel, wherein a resistance of the photoelectric conversion layer undergoes a change when the photoelectric conversion layer is irradiated by the light of the selected wavelength; and a non-transparent electrode layer on a side of the photoelectric conversion layer distal to the transparent electrode layer.

2. The display panel of claim 1, wherein the light filtering material is a visible light blocking material.

3. The display panel of claim 1, wherein the light filtering layer is made of a light filtering material comprising germanium or germanium oxide.

4. The display panel of claim 1, wherein the selected wavelength is outside the range of visible light wavelengths.

5. The display panel of claim 1, wherein the light of the selected wavelength is an infrared light.

6. The display panel of claim 1, wherein the light of the selected wavelength is an ultraviolet light.

7. The display panel of claim 1, wherein the thin film transistor is in the light filtering region.

8. The display panel of claim 1, each pixel comprises at least one photosensor and at least one thin film transistor coupled to the at least one photosensor.

9. The display panel of claim 1, each pixel comprises a plurality of subpixels, each of the plurality of subpixels comprises at least one photosensor and at least one thin film transistor coupled to the at least one photosensor.

10. The display panel of claim 1, wherein the thin film transistor comprises a gate node, a first node, and a second node; the non-transparent electrode layer is in a same layer as, and electrically isolated from, the gate node; and the photoelectric conversion layer is in a same layer as, and electrically connected to, the second node.

11. The display panel of claim 1, wherein the photoelectric conversion layer is made of a material selected from the group consisting of lead sulfate, indium tin zinc oxide, and indium gallium zinc oxide.

12. The display panel of claim 1, further comprising a control module coupled to the photosensor and the thin film transistor;

wherein the thin film transistor comprises a gate node, a first node, and a second node;

the gate node of the thin film transistor is connected to an output terminal of the control module for receiving scan signals from the control module;

the second node of the thin film transistor is connected to the photoelectric conversion layer for receiving the current of the photosensor, the first node of the thin film transistor is connected to an input terminal of the control module for transmitting a current signal to the control module;

the transparent electrode layer of the photosensor is connected to the control module for receiving a first voltage signal from the control module; and the non-transparent electrode layer of the photosensor is connected to the control module for receiving a second voltage signal from the control module, the second voltage signal being different from the first voltage signal.

13. The display panel of claim 12, wherein the control module comprises a comparator for comparing the current signal received from the first node of the thin film transistor with a control value; the control module determines the current signal to be a signal associated with a ridge line of a fingerprint or a palmprint when a difference between the current signal and the control value is larger than a threshold value.

14. The display panel of claim 12, further comprising a readline connecting the first node of the thin film transistor and the control module for transmitting the current signal to the control module.

15. The display panel of claim 1, further comprising a light guide in the light filtering region on a side of the light filtering layer distal to the photosensor, the light guide being capable of reflecting the light of the selected wavelength by total reflection.

16. A method for driving a display panel of claim 1, comprising:

providing a voltage signal to the photosensor in the light filtering region;

providing a scan signal to a gate electrode of the thin film transistor;

receiving a current signal from a first node of the thin film transistor;

comparing the current signal received from the first node of the thin film transistor with a control value; and determining the current signal to be a signal associated with a ridge line of a fingerprint or a palmprint when a difference between the current signal and the control value is larger than a threshold value.

17. The method of claim 16, wherein the step of providing the voltage signal to the photosensor in the light filtering region comprises providing a first voltage signal to a transparent electrode layer of the photosensor, and providing a second voltage signal to a non-transparent electrode layer of the photosensor, the second voltage signal being different from the first voltage signal.

18. The method of claim 17, wherein the step of receiving the current signal from the first node of the thin film transistor comprises receiving the current signal from the first node of the thin film transistor through a readline connecting the first node and the control module.

19. An electronic apparatus comprising a display panel of claim 1.

* * * * *